(12) United States Patent
Kubo et al.

(10) Patent No.: US 12,206,107 B2
(45) Date of Patent: *Jan. 21, 2025

(54) SULFUR-BASED ACTIVE MATERIAL, ELECTRODE, NON-AQUEOUS ELECTROLYTE SECONDARY BATTERY AND PRODUCING METHODS THEREOF

(71) Applicant: SUMITOMO RUBBER INDUSTRIES, LTD., Kobe (JP)

(72) Inventors: Tatsuya Kubo, Kobe (JP); Fumiya Chujo, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 362 days.

This patent is subject to a terminal disclaimer.

(21) Appl. No.: 17/240,064

(22) Filed: Apr. 26, 2021

(65) Prior Publication Data

US 2021/0367238 A1 Nov. 25, 2021

(30) Foreign Application Priority Data

May 25, 2020 (JP) .............................. 2020-090874

(51) Int. Cl.
   *H01M 4/04* (2006.01)
   *H01M 4/58* (2010.01)
   *H01M 4/583* (2010.01)

(52) U.S. Cl.
   CPC ....... *H01M 4/5815* (2013.01); *H01M 4/0471* (2013.01); *H01M 4/583* (2013.01)

(58) Field of Classification Search
   None
   See application file for complete search history.

(56) References Cited

U.S. PATENT DOCUMENTS

| 11,069,893 B2* | 7/2021 | Kubo | .................. H01M 4/5815 |
| 11,094,939 B2* | 8/2021 | Kubo | .................... H01M 4/602 |
| 11,594,732 B2* | 2/2023 | Takenouchi | .......... C08F 120/44 |

(Continued)

FOREIGN PATENT DOCUMENTS

| JP | 11269311 A | * 10/1999 |
| JP | 2011-28949 A | 2/2011 |

(Continued)

OTHER PUBLICATIONS

Japanese Office Action for Japanese Application No. 2020-090874, dated Feb. 27, 2024, with English translation.

*Primary Examiner* — Tracy M Dove
(74) *Attorney, Agent, or Firm* — Birch, Stewart, Kolasch & Birch, LLP (57) ABSTRACT

Provided is a sulfur-based active material for a non-aqueous electrolyte secondary battery having a large charge/discharge capacity and excellent cycle characteristics which is inexpensively and easily provided, an electrode comprising the sulfur-based active material, and a non-aqueous electrolyte secondary battery comprising the electrode, as well as a producing method thereof. The sulfur-based active material is obtainable by calcinating a raw material, the raw material comprising (1) a heat-expandable particle comprising an outer shell comprising an acryl-based copolymer and a hydrocarbon included inside the outer shell, the heat-expandable particle having an expansion starting temperature of 150° C. or lower, and (2) sulfur.

10 Claims, 2 Drawing Sheets

(56) References Cited

U.S. PATENT DOCUMENTS

| | | |
|---|---|---|
| 2011/0200875 A1 | 8/2011 | Miyuki et al. |
| 2013/0029222 A1* | 1/2013 | Niwa .................... H01M 4/621 |
| | | 429/211 |
| 2014/0050974 A1 | 2/2014 | Miyuki et al. |
| 2016/0293955 A1 | 10/2016 | Hochi et al. |
| 2016/0310924 A1* | 10/2016 | Nakatomi ................ B01J 13/18 |

FOREIGN PATENT DOCUMENTS

| | | | |
|---|---|---|---|
| JP | 2015-92449 A | 5/2015 | |
| WO | WO 2010/044437 A1 | 4/2010 | |
| WO | WO 2012/114651 A1 | 8/2012 | |
| WO | WO 2012/132173 A1 | 10/2012 | |
| WO | WO 2012/147242 A1 | 11/2012 | |
| WO | WO 2013/001693 A1 | 1/2013 | |
| WO | WO 2013/076958 A1 | 5/2013 | |
| WO | WO 2013/084445 A1 | 6/2013 | |
| WO | WO-2019167875 A1 * | 9/2019 | ............ C08F 120/44 |

* cited by examiner

SULFUR-BASED ACTIVE MATERIAL, ELECTRODE, NON-AQUEOUS ELECTROLYTE SECONDARY BATTERY AND PRODUCING METHODS THEREOF

TECHNICAL FIELD

The present invention relates to a sulfur-based active material used for an electrode for a non-aqueous electrolyte secondary battery, an electrode comprising the sulfur-based active material, a non-aqueous electrolyte secondary battery comprising the electrode, and producing methods thereof.

BACKGROUND OF THE INVENTION

Since the non-aqueous electrolyte secondary battery has a large charge/discharge capacity, it has been mainly used as a battery for a portable electronic device. In addition, an increasing amount of the non-aqueous electrolyte secondary battery has been used for a battery for an electric vehicle and has been expected to improve in performance.

WO 2010/044437 describes a cathode active material for a lithium-ion secondary battery obtained by heating a raw material powder comprising a sulfur powder and a polyacrylonitrile powder under a non-oxidizing atmosphere. Moreover, JP 2015-092449 A aims to provide a cathode active material at low cost by using an industrial rubber.

On the other hand, for an anode active material, it has been proposed to increase a battery capacity of the lithium-ion secondary battery by using a material, such as silicon (Si) and tin (Sn), that can occlude and release more lithium ions.

SUMMARY OF THE INVENTION

However, the cathode active material in WO 2010/044437 has a problem that it is difficult to provide a lithium-ion secondary battery at low cost, since polyacrylonitrile, which is a raw material, is expensive, in particular, polyacrylonitrile with stable quality is more expensive. The cathode active material in JP 2015-092449 still has a problem in sufficiently improving cycle characteristics. The above-described material that has been proposed as an anode active material has a problem that the cycle characteristics when repeatedly charging and discharging is not good because a volume change due to occlusion and release of lithium ions is large. In addition, carbon materials such as graphite and hard carbon are also used, but the theoretical capacity has been almost reached already, and a significant capacity improvement cannot be expected.

It is an object of the present invention to provide a novel sulfur-based active material which is capable of improving a charge/discharge capacity and cycle characteristics of a non-aqueous electrolyte secondary battery, an electrode comprising the sulfur-based active material, and a non-aqueous electrolyte secondary battery comprising the electrode, as well as producing methods thereof.

As a result of intensive studies, the present inventors have found that the above-described problems can be solved by using a sulfur-based active material obtainable by calcinating a raw material comprising (1) a heat-expandable particle comprising an outer shell comprising an acryl-based copolymer and a hydrocarbon included inside the outer shell, the heat-expandable particle having an expansion starting temperature of 150° C. or lower, and (2) sulfur, and conducted further studies to complete the present invention.

That is, the present invention relates to:
[1] A sulfur-based active material,
the sulfur-based active material being obtainable by calcinating a raw material,
the raw material comprising
(1) a heat-expandable particle comprising an outer shell comprising an acryl-based copolymer and a hydrocarbon included inside the outer shell, the heat-expandable particle having an expansion starting temperature of 150° C. or lower, preferably 70 to 150° C., and
(2) sulfur,
[2] The sulfur-based active material of [1] above, wherein a temperature of the calcination is 250 to 550° C., preferably 300 to 500° C., more preferably 350 to 500° C.,
[3] The sulfur-based active material of [1] or [2] above, wherein the acryl-based copolymer is a copolymer comprising methacrylonitrile as a monomer component and one or more monomer components other than methacrylonitrile,
[4] The sulfur-based active material of [3] above, wherein one or more monomer components other than methacrylonitrile are one or more selected from the group consisting of acrylonitrile and a (meth)acrylic acid ester,
[5] The sulfur-based active material of any one of [1] to [4] above, wherein the hydrocarbon is one or more selected from the group consisting of isobutane, isopentane and isooctane,
[6] The sulfur-based active material of any one of [1] to [5] above, wherein the raw material further comprises (3) a conductive auxiliary agent,
[7] The sulfur-based active material of [6] above, wherein the conductive auxiliary agent is a conductive carbon material,
[8] The sulfur-based active material of any one of [1] to [7] above, wherein a particle size of the heat-expandable particle is 0.1 to 1000 µm, preferably 0.5 to 500 µm, more preferably 1 to 100 µm, further preferably 5 to 50 µm,
[9] An electrode for a non-aqueous electrolyte secondary battery, comprising the sulfur-based active material of any one of [1] to [8] above,
[10] A non-aqueous electrolyte secondary battery, comprising the electrode of [9] above,
[11] A method of producing a sulfur-based active material,
the method comprising a step of calcinating a raw material,
the raw material comprising
(1) a heat-expandable particle comprising an outer shell comprising an acryl-based copolymer and a hydrocarbon included inside the outer shell, the heat-expandable particle having an expansion starting temperature of 150° C. or lower, preferably 70 to 150° C., and
(2) sulfur.

According to the present invention, a sulfur-based active material for a non-aqueous electrolyte secondary battery having a large charge/discharge capacity and excellent cycle characteristics, an electrode comprising the sulfur-based active material, and a non-aqueous electrolyte secondary battery comprising the electrode, as well as producing methods thereof can be provided inexpensively and easily.

In the present specification, the "cycle characteristics" refers to characteristics of maintaining charge/discharge capacity of a secondary battery despite repeated charging/discharging. Therefore, a secondary battery having a large degree of decrease in charge/discharge capacity and a low capacity retention with the repeated charging/discharging is inferior in cycle characteristics, while on the other hand, a secondary battery having a small degree of decrease in charge/discharge capacity and a high capacity retention is excellent in cycle characteristics.

DETAILED DESCRIPTION

The structure of the present disclosure will be described in detail below. However, the following descriptions are illustrative for explaining the present disclosure and are not intended to limit the technical scope of the present disclosure to this description range only. Besides, a numerical value of lower limit combined with "or more (higher)" or "to" and a numerical value of upper limit combined with "or less (lower)" or "to" with respect to description of a numerical range can be arbitrarily combined, and a numerical value in Examples can also be used as an upper or a lower limit. In addition, a numerical range identified with "to" means to include the numerical values of both ends, unless otherwise specified.

One embodiment of the present disclosure is a sulfur-based active material obtainable by calcinating a raw material comprising (1) a heat-expandable particle comprising an outer shell comprising an acryl-based copolymer and a hydrocarbon included inside the outer shell, the heat-expandable particle having an expansion starting temperature of 150° C. or lower, and (2) sulfur.

The following reasons are considered for which a sulfur-based active material having a large charge/discharge capacity and excellent cycle characteristics can be obtainable in the present disclosure, though these are not intended to be bound by theory. That is, when a raw material comprising a heat-expandable particle comprising an outer shell comprising an acryl-based copolymer and a hydrocarbon included inside the outer shell, the heat-expandable particle having a predetermined expansion starting temperature, and sulfur is calcinated, the outer shell of the heat-expandable particle first begins to soften as the temperature rises due to heating, and at the same time, the hydrocarbon included starts to gasify and makes the internal pressure increased, so that the particle starts to expand. When sulfur is in a liquid state at the start of this expansion, it moves following the expansion of the heat-expandable particle, thereby resulting in a good dispersion of sulfur and a uniform contact of sulfur with the outer shell of the heat-expandable particle. In the present disclosure, because the expansion starting temperature of the heat-expandable particle is 150° C. or less, sulfur is in a liquid state, not in an amorphous state (a rubber state), at the start of the expansion, and thus it is considered that the uniform contact of sulfur with the outer shell of the heat-expandable particle as described above is achieved.

As the temperature further rises, the internal pressure due to a hydrocarbon gas rises, the thickness of the outer shell of the heat-expandable particle becomes thinner, and, as a result, modification of the outer shell is promoted by the well-dispersed sulfur. It is considered that, as a result of the outer shell being uniformly and sufficiently modified with sulfur through the process as described above, a sulfur-based active material having a large charge/discharge capacity and excellent cycle characteristics can be obtained.

The calcinating temperature is preferably 250 to 550° C.

The acryl-based copolymer is preferably a copolymer comprising methacrylonitrile as a monomer component and one or more monomer components other than methacrylonitrile.

One or more monomer components other than methacrylonitrile are preferably one or more selected from the group consisting of acrylonitrile and a (meth)acrylic acid ester.

The hydrocarbon is preferably one or more selected from the group consisting of isobutane, isopentane and isooctane.

The raw material preferably further comprises (3) a conductive auxiliary agent.

The conductive auxiliary agent is preferably a conductive carbon material.

The particle size of the heat-expandable particle is preferably 0.1 to 1000 μm.

Another embodiment of the present disclosure is an electrode for a non-aqueous electrolyte secondary battery, comprising the above-described sulfur-based active material.

Another embodiment of the present disclosure is a non-aqueous electrolyte secondary battery comprising the above-described electrode.

Another embodiment of the present disclosure is a method of producing a sulfur-based active material, the method comprising a step of calcinating a raw material, the raw material comprising a heat-expandable particle comprising an outer shell comprising an acryl-based copolymer and a hydrocarbon included inside the outer shell, the heat-expandable particle having an expansion starting temperature of 150° C. or lower, and sulfur.

<Sulfur-Based Active Material>

The sulfur-based active material of the present embodiment is obtainable by calcinating a raw material, the raw material comprising (1) a heat-expandable particle comprising an outer shell comprising an acryl-based copolymer and a hydrocarbon included inside the outer shell, the heat-expandable particle having an expansion starting temperature of 150° C. or lower, and (2) sulfur. The raw material may further comprise (3) a conductive auxiliary agent. Moreover, the raw material may further comprise (4) a vulcanization accelerator.

(Heat-Expandable Particle)

The heat-expandable particle of the present embodiment can be appropriately used as long as it has an outer shell comprising an acryl-based copolymer and a hydrocarbon included inside the outer shell and has an expansion starting temperature of 150° C. or lower. The expansion starting temperature of the heat-expandable particle, at which the heat-expandable particle starts to expand, is a temperature determined by a power relationship between a strength of the outer shell of the heat-expandable particle which gradually softens and a gas pressure of the hydrocarbon included which gradually rises as an ambient temperature rises. In the present disclosure, it is considered that, when the expansion starting temperature is 150° C. or lower, the modification of the outer shell of the heat-expandable particle with sulfur becomes uniform as described above, and thus an effect of the present disclosure can be obtained. Besides, the lower limit of the expansion starting temperature is, but not particularly limited to, usually 70° C. or higher.

Here, the acryl-based copolymer means a copolymer comprising at least one acrylic monomer and composed of two or more monomer components. In this case, a copolymerization ratio of the acrylic monomer is preferably 50% or more, more preferably more than 50%.

The acryl-based copolymer is not particularly limited as long as it satisfies a predetermined expansion starting temperature under the expansion mechanism as described above in relation to the hydrocarbon included, but preferred examples thereof include, for example, those comprising methacrylonitrile as an acrylic monomer. In this case, the acryl-based copolymer may be a homopolymer of methacrylonitrile (polymethacrylonitrile), a copolymer comprising methacrylonitrile as a monomer component and one or more monomer components other than methacrylonitrile, or a copolymer consisting of methacrylonitrile and one or more monomer components other than methacrylonitrile.

As a monomer component other than methacrylonitrile, known (meth)acrylic monomers such as acrylonitrile, a (meth)acrylic acid, a (meth)acrylic acid ester, and (meth)acrylamide can be appropriately used. Among them, one or more selected from the group consisting of acrylonitrile and a (meth)acrylic acid ester are preferable. Here, examples of the (meth)acrylic acid ester include a (meth)acrylic acid alkyl ester. Furthermore, examples of "alkyl" in this case include $C_{1-6}$ alkyl, preferably $C_{1-4}$ alkyl, and among them, methyl is preferable. Besides, in the present specification, "(meth)acrylic" means "acryl" or "methacryl".

As a monomer component other than methacrylonitrile, one or more selected from the group consisting of acrylonitrile and methyl methacrylate are more preferable, and acrylonitrile and methyl methacrylate are further preferable.

Moreover, as a monomer component other than methacrylonitrile, a conjugated diene compound such as butadiene and isoprene can also be used.

In the copolymer, a copolymerization ratio of methacrylonitrile is usually 1 to 99%, preferably 10 to 95%, more preferably 20 to 90%, further preferably 30 to 80%.

A weight-average molecular weight (Mw) of the polymer is preferably 1,000 to 1,000,000, more preferably 10,000 to 300,000. Besides, the Mw can be calculated in terms of a standard polystyrene based on measurement values obtained by a gel permeation chromatography (GPC) (GPC-8000 Series manufactured by Tosoh Corporation, detector: differential refractometer, column: TSKGEL SUPERMULTIPORE HZ-M manufactured by Tosoh Corporation).

In addition, the heat-expandable particle can be manufactured according to the methods described in JP 42-26524 B, JP 60-19033 B, JP 6370219 B, etc. Specifically, the heat-expandable particle can be manufactured by, for example, a step of preparing an aqueous dispersion comprising the monomer components illustrated above, a hydrocarbon and a dispersion stabilizer used to maintain dispersion, and a step of polymerizing the monomers.

In addition, as such a heat-expandable particle, a commercially available heat-expandable particle can be used such as those manufactured by Japan Fillite Co., Ltd., those manufactured by Matsumoto Yushi-Seiyaku Co., Ltd, those manufactured by Kureha Corporation, and those manufactured by Sekisui Chemical Co., Ltd.

A boiling point of the hydrocarbon is a temperature below a softening point of the outer shell of the heat-expandable particle and is not particularly limited as long as it enables the heat-expandable particle to start to expand at a predetermined expansion starting temperature under the expansion mechanism as described above. The boiling point of the hydrocarbon is usually −20° C. to 120° C., preferably 0° C. to 100° C., more preferably 20° C. to 80° C. Specific examples of the hydrocarbon include, for example, a saturated or unsaturated aliphatic hydrocarbon having 2 to 10 carbon atoms; preferably a saturated or unsaturated aliphatic hydrocarbon having 3 to 8 carbon atoms; more preferably butane, isobutane, isobutene, pentane, isopentane, neopentane, cyclopentane, hexane, neohexane, cyclohexane, heptane, octane, and isooctane; further preferably isobutane, isopentane and isooctane. These hydrocarbons may be used alone, or two or more thereof may be used in combination.

A content of the hydrocarbon in the heat-expandable particle is preferably 1 to 70% by mass, more preferably 3 to 40% by mass, further preferably 5 to 20% by mass.

An average particle size ($D_{50}$) of the heat-expandable particle before expansion is preferably 0.1 to 1000 μm, more preferably 0.5 to 500 μm, further preferably 1 to 100 μm, further preferably 5 to 50 μm. In the present disclosure, the average particle size ($D_{50}$) is measured on a volume basis by a laser diffraction/scattering method.

The outer shell of the heat-expandable particle may comprise a polymerization catalyst such as magnesium hydroxide or a polymerization initiator, in addition to the acryl-based copolymer. A content of the acryl-based copolymer based on 100% by mass of the outer shell of the heat-expandable particle is preferably 80% by mass or more, more preferably 85% by mass or more, further preferably 90% by mass or more, particularly preferably 95% by mass or more.

A film thickness of the outer shell of the heat-expandable particle is not particularly limited as long as it enables the expansion starting temperature of the heat-expandable particle to be equal to or lower than a predetermined temperature, and it may vary depending on a type of an acryl-based copolymer or the like constituting the outer shell and a type of a hydrocarbon to be included, etc., though it is usually about 2 to 15 μm.

(Sulfur)

As sulfur, all of a powdered sulfur, an insoluble sulfur, a precipitated sulfur, a colloidal sulfur, and the like can be used. Among them, a precipitated sulfur or a colloidal sulfur is preferable. A compounding amount of sulfur is preferably 250 parts by mass or more, more preferably 300 parts by mass or more, based on 100 parts by mass of the heat-expandable particle, from the viewpoints of charge/discharge capacity and cycle characteristics. On the other hand, an upper limit of the compounding amount of sulfur is, but not particularly limited to, preferably 1500 parts by mass or less, more preferably 1000 parts by mass or less, otherwise the charge/discharge capacity is saturated which is disadvantageous in terms of cost.

(Conductive Auxiliary Agent)

The conductive auxiliary agent is not particularly limited, and any of those usually used in this field can be appropriately used. For example, a conductive carbon material such as a vapor-grown carbon fiber (VGCF), a carbon powder, carbon black. (CB), acetylene black (AB), ketjen black (KB), and graphite can be appropriately used. From the viewpoints of capacity density, input/output characteristics, and conductivity, acetylene black (AB) or ketjen black (KB) is preferable. These conductive auxiliary agents may be used alone, or two or more thereof may be used in combination.

An compounding amount of the conductive auxiliary agent when compounded based on 100 parts by mass of the heat-expandable particle is preferably 1 part by mass or more, more preferably 3 parts by mass or more, further preferably 5 parts by mass or more, from the viewpoints of charge/discharge capacity and cycle characteristics. On the other hand, the compounding amount is preferably 50 parts by mass or less, more preferably 30 parts by mass or less. When it is 1 part by mass or more, an effect by adding the conductive auxiliary agent tends to be easily obtained, and when it is 50 parts by mass or less, a ratio of a structure comprising sulfur in the sulfur-based active material can be relatively increased, and there is a tendency to easily achieve the purpose of further improving the charge/discharge capacity and cycle characteristics.

(Vulcanization Accelerator)

An compounding amount of the vulcanization accelerator when compounded based on 100 parts by mass of the heat-expandable particle is preferably 3 parts by mass or more, more preferably 10 parts by mass or more, from the viewpoints of charge/discharge capacity and cycle characteristics. On the other hand, an upper limit of the compounding amount is, but not particularly limited to, preferably 250 parts by mass or less, more preferably 50 parts by mass or less, otherwise the charge/discharge capacity is saturated which is disadvantageous in terms of cost.

(Calcination)

Calcination of a raw material comprising the above-described components is carried out by heating the raw material under a non-oxidizing atmosphere.

<<Non-Oxidizing Atmosphere>>

The non-oxidizing atmosphere refers to an atmosphere that does not substantially comprise oxygen and is adopted to suppress oxidative deterioration and excessive thermal decomposition of constituents. Specifically, it refers to an inert gas atmosphere filled with an inert gas such as nitrogen or argon, a sulfur gas atmosphere, or the like. Therefore, calcination is carried out, for example, in a quartz tube under the inert gas atmosphere.

<<Temperature Rising Rate>>

The temperature rising rate is preferably in the range of, for example, 50 to 500° C./h. The temperature rising rate is more preferably 100° C./h or higher, further preferably 120° C./h or higher. On the other hand, the temperature rising rate is more preferably 400° C./h or lower, further preferably 300° C./h or lower, further preferably 200° C./h or lower, further preferably 180° C./h or lower. When the temperature rising rate is within such a range, there is a tendency to easily achieve the purpose of improving the charge/discharge capacity and cycle characteristics.

<<Calcinating Temperature/Time>>

The calcinating temperature is a temperature after completion of temperature rise and to be maintained for a certain period of time for calcinating a raw material. The temperature is preferably in a range of 250 to 550° C. When the temperature is 250° C. or higher, modification with sulfur proceeds sufficiently, and there is a tendency that a decrease in charge/discharge capacity of an objective material can be prevented. On the other hand, when the temperature is 550° C. or lower, decomposition of a calcinated raw material is prevented, and there is a tendency that a decrease in yield and a decrease in charge/discharge capacity can be prevented. The temperature is more preferably 300° C. or higher, more preferably 350° C. or higher. On the other hand, the temperature is more preferably 500° C. or lower, more preferably 450° C. or lower. A time for maintaining at a calcinating temperature may be appropriately set according to a type of a calcinated raw material, a calcinating temperature, etc., but is preferably 1 to 6 hours, for example. When it is 1 hour or more, there is a tendency that calcination can be proceeded sufficiently, and when it is 6 hours or less, there is a tendency that excessive thermal decomposition of the constituents can be prevented.

<<Apparatus>>

Figure 1:
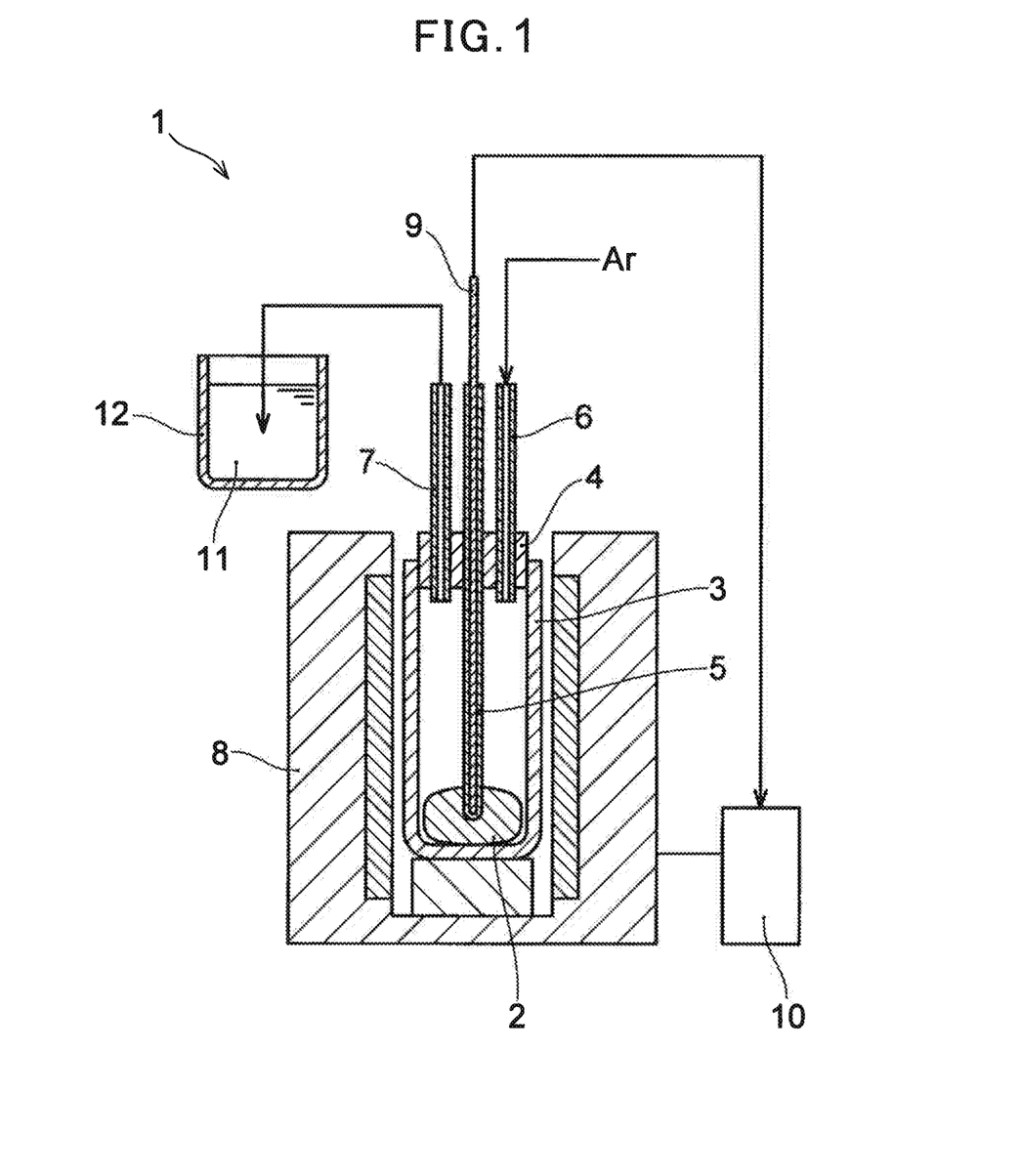
FIG. 1 is a cross-sectional view schematically showing a reaction apparatus used for producing a sulfur-based active material.

Calcination can be carried out by using an apparatus shown in FIG. 1, as well as, for example, a continuous type apparatus such as a twin-screw extruder. When the continuous type apparatus is used, there is an advantage that a sulfur-based active material can be continuously produced by a series of operations, such as by kneading, pulverizing and mixing a raw material with calcination in the apparatus.

<<Step of Removing Residue>>

An unreacted sulfur which were precipitated from sublimated sulfur during calcination by cooling, etc., remains in a sulfide obtained after calcination. It is desirable to remove these residues as much as possible because they cause deterioration in cycle characteristics. The removal of the residues can be carried out according to a conventional method such as pressure reducing and heat drying, warm air drying, and solvent washing.

(Active Material)

Since the sulfur-based active material thus obtained is a fine powder having a median diameter of less than 10 µm, it can directly be used for coating on an electrode without further pulverization or classification, but in order to remove more impurities, classification may be performed. In normal use, the heat-expandable particle serves as a foaming agent in which a hydrocarbon in a hollow particle expands by heating and accordingly a shell also expands.

The higher a total sulfur content in the sulfur-based active material is, the more the cycle characteristics of the non-aqueous electrolyte secondary battery tend to improve, and therefore, the total sulfur content in the sulfur-based active material by elemental analysis is 35% by mass or more, more preferably 40% by mass or more, further preferably 45% by mass or more. However, when a conductive carbon material is compounded, it may be possible to expect an effect of improvement in charge/discharge capacity and cycle characteristics even if the sulfur content is somewhat lower due to an influence by carbon constituting the conductive carbon material. A sulfur content in such a case may be lower than the above-described sulfur content by about 5.0% by mass.

In addition, hydrogen (H) in the heat-expandable particle reacts with sulfur by calcination to become hydrogen sulfide, which disappears from the sulfide. Therefore, a hydrogen content in the sulfur-based active material is preferably 1.6% by mass or less. When it is 1.6% by mass or less, calcination (sulfur modification) tends to be sufficient. Thus, in this case, the charge/discharge capacity tends to improve. The hydrogen content is more preferably 1.0% by mass or less, further preferably 0.8% by mass or less.

The sulfur-based active material according to the present embodiment is characterized by having a peak around 1530 around 1320 $cm^{-1}$, around 940 $cm^{-1}$, around 470 $cm^{-1}$, around 370 $cm^{-1}$, and around 310 $cm^{-1}$ within a range of 200 $cm^{-1}$ to 1800 $cm^{-1}$ in the Raman spectrum. Among them, a peak around 1320 $cm^{-1}$ is the main peak. Each of the above-described peaks can exist within a range of approximately ±8 $cm^{-1}$ as the above-described peak position being centered. Besides, the Raman shift described above is measured with RAMANtouch (excitation wavelength λ=532 nm, grating: 1200 gr/mm, resolution: 1.2 $cm^{-1}$) manufactured by Nanophoton Corp.

When the heat-expandable particle and sulfur are mixed and heated at the predetermined temperature, a ring closure reaction occurs, and sulfur is incorporated into the acryl-based copolymer to form a three-dimensionally crosslinked structure. In the sulfur-based active material according to the present embodiment thus obtained, elution of a sulfur active material into an electrolyte is suppressed in a charge/discharge cycle. As such, the non-aqueous electrolyte secondary battery using the sulfur-based active material for the electrode improves in cycle characteristics.

<Electrode>

The electrode (positive electrode and negative electrode) for a non-aqueous electrolyte secondary battery according to the present embodiment can be produced by a conventional method using the above-described sulfur-based active material, a binder, a conductive auxiliary agent and a solvent, and a current collector. Such an electrode for a non-aqueous electrolyte secondary battery can have a structure similar to that of a general non-aqueous electrolyte power storage device.

The electrode for a non-aqueous electrolyte secondary battery can be produced, for example, by applying an electrode slurry, in which the above-described sulfur-based active material, a binder, a conductive auxiliary agent and solvent are mixed, to a current collector. As another method, it can also be produced by kneading a mixture of the sulfur-based active material, a conductive auxiliary agent and a binder with a mortar and forming it into a film with a press machine, and crimping the film-shaped mixture to a current collector with a press machine or the like.

These electrodes for non-aqueous electrolyte secondary batteries can be preferably used as an electrode for lithium-ion secondary batteries.

(Current Collector)

As current collectors, those generally used as electrodes for non-aqueous electrolyte secondary batteries can be used. Specific examples of the current collector include, for example, aluminum-based current collectors such as an aluminum foil, an aluminum mesh, a punching aluminum sheet, and an aluminum expand sheet; stainless-based current collectors such as a stainless steel foil, a stainless steel mesh, a punching stainless steel sheet, and a stainless steel expand sheet; nickel-based current collectors such as a foamed nickel and a nickel non-woven fabric; copper-based current collectors such as a copper foil, a copper mesh, a punching copper sheet, and a copper expand sheet; titanium-based current collectors such as a titanium foil and a titanium mesh; and carbon-based current collectors such as a carbon non-woven fabric and a carbon woven fabric. Among them, aluminum-based current collectors are preferable from the viewpoints of mechanical strength, conductivity, mass density, cost, etc.

A shape of the current collector is not particularly limited, but, for example, a foil-like base material, a three-dimensional base material, or the like can be used. By using a three-dimensional base material (foam metal, mesh, woven fabric, non-woven fabric, expand, etc.), an electrode with a high capacity density can be obtained even with a binder that lacks adhesiveness to the current collector, and high-rate charge/discharge characteristics also tends to improve.

(Binder)

As a binder, a known binder used for an electrode can be used, but an aqueous binder is appropriately used from the viewpoints of affinity with water and reduction in environmental load. Examples of the aqueous binder include, for example, hydroxypropyl cellulose (HPC), carboxymethyl cellulose (CMC), polyvinyl alcohol (PVA), acrylic resin, a styrene-butadiene rubber (SBR), water-soluble polyimide (PI), water-soluble polyamide-imide (PAI), methacrylic resin (PMA), polyethylene oxide (PEO), urethane, and the like. These binders may be used alone, or two or more thereof may be used in combination.

(Conductive Auxiliary Agent)

As a conductive auxiliary agent, a conductive auxiliary agent that can be used for producing the sulfur-based active material can be similarly used.

(Solvent)

In producing an electrode slurry, as solvent used for dispersing solid components such as a sulfur-based active material, a binder, and a conductive auxiliary agent, solvent comprising water (an aqueous solvent) is preferable, and water is preferable. When an organic solvent other than water is used, a sulfur component that contributes to a charge/discharge reaction elutes from the sulfur-based active material, and the charge/discharge capacity of the battery tends to decrease. Furthermore, the aqueous solvent is preferable also from the viewpoint of reduction in environmental load. In addition, solvent that is miscible with water, such as N-methyl-2-pyrrolidone (NMP), N,N-dimethylformaldehyde, lower alcohol, and the like, may be mixed, as long as the effect of the present disclosure is not compromised (for example, an amount of the organic solvent other than water is less than 20% by mass).

A content of the sulfur-based active material based on 100% by mass of the solid components (particularly the sulfur-based active material, the binder, and the conductive auxiliary agent; the same applies hereinafter) in the electrode slurry is preferably 85% by mass or more, more preferably 87% by mass or more, further preferably 90% by mass or more. In addition, an upper limit of the content of the sulfur-based active material is, but not particularly limited to, preferably 99% by mass or less, more preferably 97% by mass or less, further preferably 95% by mass or less.

A content of the binder based on 100% by mass of the solid components in the electrode slurry is preferably 0.1 to 10.0% by mass, more preferably 0.5 to 8.0% by mass, further preferably 1.0 to 6.0% by mass, particularly preferably 2.0 to 5.0% by mass.

A content of the conductive auxiliary agent when compounded based on 100% by mass of the solid component in the electrode slurry is preferably 0.1 to 10.0% by mass, more preferably 0.5 to 8.0% by mass, further preferably 1.0 to 6.0% by mass, particularly preferably 2.0 to 5.0% by mass.

<Non-Aqueous Electrolyte Secondary Battery>

The non-aqueous electrolyte secondary battery can be produced by a conventional method using the electrode (positive electrode or negative electrode) for a non-aqueous electrolyte secondary battery according to the present embodiment mentioned above, an electrode as a counter electrode thereof, an electrolyte, etc. The non-aqueous electrolyte secondary battery may comprise, for example, a member such as a separator in addition to the positive electrode, the negative electrode and the electrolyte. The separator intervenes between the positive and negative electrodes to allow for movement of ions between the two electrodes and functions to prevent an internal short circuit between the positive and negative electrodes. If the non-aqueous electrolyte secondary battery is of a closed type, the separator is also required to have a function of holding an electrolytic solution.

(Counter Electrode)

When the sulfur-based active material according to the present embodiment is used for the positive electrode, as the negative electrode which is a counter electrode thereof, a known negative electrode material can be used, such as, for example, metallic lithium; a carbon-based material such as graphite; a silicon-based material such as a silicon thin film or SiO; a tin alloy-based material such as copper-tin or cobalt-tin. When a lithium-free material such as, for example, a carbon-based material, a silicon-based material, or a tin alloy-based material is used for the negative electrode, a short circuit between the positive and negative electrodes due to generation of dendrite can be less likely to occur, and the life of the non-aqueous electrolyte secondary battery can be extended. Among them, a silicon-based material, which is a high-capacity negative electrode material, is preferable, and a thin-film silicon, which can reduce the electrode thickness and has an advantage in terms of capacity per volume, is more preferable.

However, when a lithium-free negative electrode material is used in combination with the positive electrode according to the present embodiment, neither the positive electrode nor the negative electrode comprises lithium, and therefore, pre-doping treatment, in which lithium is previously inserted, is preferable for either or both of the electrodes.

As a pre-doping method, a known method can be utilized. For example, when lithium is doped into the negative electrode, an electrolytic doping method in which a semi-battery is assembled using metallic lithium as a counter electrode to electrochemically dope lithium, an attaching pre-doping method in which a metallic lithium foil is left in an electrolytic solution with the foil being attached to the electrode to dope by diffusion of the lithium to the electrode, or the like is exemplified. In addition, the electrolytic doping method mentioned above can also be adopted when lithium is pre-doped into the positive electrode.

When the sulfur-based active material according to the present embodiment is used for the negative electrode, for the positive electrode as a counter electrode thereof, a composite oxide of lithium and a transition metal (particularly, a cobalt-based composite oxide, a nickel-based composite oxide, a manganese-based composite oxide, or a ternary composite oxide composed of three elements of cobalt, nickel, and manganese) or the like can be used, for example. Furthermore, a lithium-transition metal phosphate having an olivine type crystal structure (particularly, lithium iron phosphate, lithium manganese phosphate) and the like can also be used. When an electrode comprising a lithium transition metal composite oxide-based compound as an active material and an electrode comprising the electrode slurry according to the present embodiment in combination are used for a positive electrode and a negative electrode, respectively, the positive electrode comprises lithium, and thus a lithium pre-doping treatment for inserting lithium is not necessarily required.

(Electrolyte)

Any liquid or solid electrolyte having an ionic conductivity may be used as an electrolyte constituting the non-aqueous electrolyte secondary battery, and those electrolytes used for known non-aqueous electrolyte secondary batteries can be used, but those in which an alkali metal salt, being a supporting electrolyte, is dissolved in an organic solvent is preferably used from the viewpoint of high output characteristics of the battery.

Examples of the organic solvent include, for example, at least one selected from non-aqueous solvents such as ethylene carbonate, propylene carbonate, dimethyl carbonate, diethyl carbonate, ethyl methyl carbonate, dimethyl ether, γ-butyrolactone, and acetonitrile. Examples of the organic solvent preferably include ethylene carbonate, propylene carbonate, or a mixed solvent thereof.

Examples of the supporting electrolyte include, for example, $LiPF_6$, $LiBF_4$, $LiAsF_6$, $LiCF_3SO_3$, $LiI$, $LiClO_4$ and the like, and among them, $LiPF_6$ is preferable.

A concentration of the supporting electrolyte may be about 0.5 mol/L to 1.7 mol/L. In addition, the electrolyte is not limited to one in a liquid state. For example, when the non-aqueous electrolyte secondary battery is a lithium-ion secondary battery, the electrolyte may be in a solid state (for example, in a polymer gel state), or may be an ionic liquid, a molten salt, or the like.

(Separator)

As a separator, it is preferable to use a thin-walled and microporous or non-woven film made of, for example, polyethylene, polypropylene, polyacrylonitrile, aramid, polyimide, cellulose, glass, or the like.

(Battery Shape)

A shape of the non-aqueous electrolyte secondary battery according to the present embodiment is not particularly limited, and various shapes such as a cylindrical type, a laminated type, a coin type, and a button type can be used.

(Use of Battery)

Since the non-aqueous electrolyte secondary battery comprising the electrode according to the present embodiment has a high capacity and excellent cycle characteristics, it can be used for an electric device that can be used as a power source for smartphones, power tools, automobiles, UPS, and the like.

EXAMPLE

The present disclosure will be specifically described based on Examples, but the present disclosure is not limited these Examples.

Various chemicals used in Examples and Comparative examples will be described.

Particle 1: Expancel 980-120-Du (manufactured by Japan Fillite Co., Ltd.; heat-expandable particle in which 2,2,4-trimethylpentane is included inside an outer shell composed of a copolymer of methacrylonitrile, acrylonitrile, and methyl methacrylate; expansion starting temperature: 158 to 173° C.; particle size: 25 to 40 μm)

Particle 2: Expancel 920-40-Du (manufactured by Japan Fillite Co., Ltd.; heat-expandable particle in which isopentane is included inside an outer shell composed of a copolymer of methacrylonitrile, acrylonitrile, and methyl methacrylate; expansion starting temperature: 123 to 133° C.; particle size: 10 to 16 μm)

Particle 3: Matsumoto Microsphere (registered trademark) FN-180SS (manufactured by Matsumoto Yushi Seiyaku Co., Ltd; heat-expandable particle in which a hydrocarbon is included inside an outer shell composed of an acryl-based copolymer; expansion starting temperature: 135-150° C.; particle size: 15-25 μm)

Particle 4: Matsumoto Microsphere (registered trademark) FN-100S (manufactured by Matsumoto Yushi Seiyaku Co., Ltd; heat-expandable particle in which a hydrocarbon is included inside an outer shell composed of an acryl-based copolymer; expansion starting temperature: 125-135° C.; particle size: 10-20 μm)

Sulfur: Precipitated Sulfur manufactured by Tsurumi Chemical Industry Co., ltd.

Example 1

(Preparation of Raw Material)

According to the formulation shown in Table 1, Particle 1 and sulfur were mixed with a blender to obtain a raw material for calcination (raw material to be calcinated).

(Reaction Apparatus)

A reaction apparatus 1 shown in FIG. 1 was used for calcinating a raw material. The reaction apparatus 1 comprises a reaction vessel 3 with an outer diameter of 60 mm, an inner diameter of 50 mm, and a height of 300 mm made of a quartz glass having a bottomed cylindrical shape for accommodating and calcinating a raw material 2, a lid 4 made of silicone for closing an upper opening of the reaction vessel 3, one alumina protective tube 5 penetrating the lid 4 ("Alumina SSA-S" manufactured by Nikkato Corporation, outer diameter: 4 mm, inner diameter: 2 mm, length: 250 mm), a gas introduction tube 6 and a gas discharge tube 7 (for both, "Alumina SSA-S" manufactured by Nikkato Corporation, outer diameter: 6 mm, inner diameter: 4 mm, length: 150 mm), and an electric furnace 8 for heating the reaction vessel 3 from the bottom side (a crucible furnace, opening width: φ80 mm, heating height: 100 mm).

The alumina protective tube 5 is formed to have a length below the lid 4 that reaches the raw material 2 accommodated in the bottom of the reaction vessel 3, and a thermocouple 9 is inserted therein. The alumina protective tube 5 is used as a protective tube for the thermocouple 9. The tip of the thermocouple 9 is inserted into the raw material 2 while being protected by the closed tip of the alumina protective tube 5 and functions to measure temperature of the raw material 2. An output of the thermocouple 9 is input to a temperature controller 10 of the electric furnace 8 as shown by the arrow with solid line in the figure, and the temperature controller 10 functions to control the heating temperature of the electric furnace 8 based on this input from the thermocouple 9.

The lower ends of the gas introduction tube 6 and the gas discharge tube 7 are formed so as to protrude downward from the lid 4 by 3 mm.

Argon (Ar) gas is continuously supplied from a gas supply system (not shown) to the gas introduction tube 6. In addition, the gas discharge tube 7 is connected to a trap tank 12 accommodating a sodium hydroxide aqueous solution 11. An exhaust gas going out of the reaction vessel 3 through the gas discharge tube 7 is once passed through the sodium hydroxide aqueous solution 11 in the trap tank 12 and then discharged to the outside. Therefore, even if the exhaust gas contains a hydrogen sulfide gas generated by a vulcanization reaction, the hydrogen sulfide gas is neutralized with the sodium hydroxide aqueous solution and removed from the exhaust gas.

(Calcinating Step)

In the calcinating step, first, Ar gas was continuously supplied at a flow rate of 80 mL/min from the gas supply system with the raw material 2 being accommodated in the bottom of the reaction vessel 3, and 30 minutes after the initiation of the supply, heating by the electric furnace 8 was initiated. The heating was performed at a temperature rising rate of 150° C./hour. And when the temperature of the raw material reached 450° C., calcination was performed for 2 hours while maintaining the temperature of 450° C. Next, while adjusting the flow rate of Ar gas, temperature of a reaction product was naturally cooled to 25° C. under an Ar gas atmosphere, and then the reaction product was taken out from the reaction vessel 3.

(Removal of Unreacted Sulfur)

The following steps were performed in order to remove unreacted sulfur (elemental sulfur in a free state) remaining in the product after the calcinating step. That is, the product was pulverized with a mortar, and 2 g of the pulverized product was accommodated in a glass tube oven and heated at 250° C. for 3 hours while being sucked by a vacuum to obtain a sulfur-based active material in which unreacted sulfur is removed (or which comprises a small amount of unreacted sulfur only). The temperature rising rate was set to be 10° C./min.

(Classification)

In order to remove impurities comprised in a calcinated product, classification was performed by using a 32 μm mesh stainless steel sieve to obtain a sulfur-based active material. This material was used as a sulfur-based active material of Example 1.

(Raman Spectrum Analysis)

Figure 2:
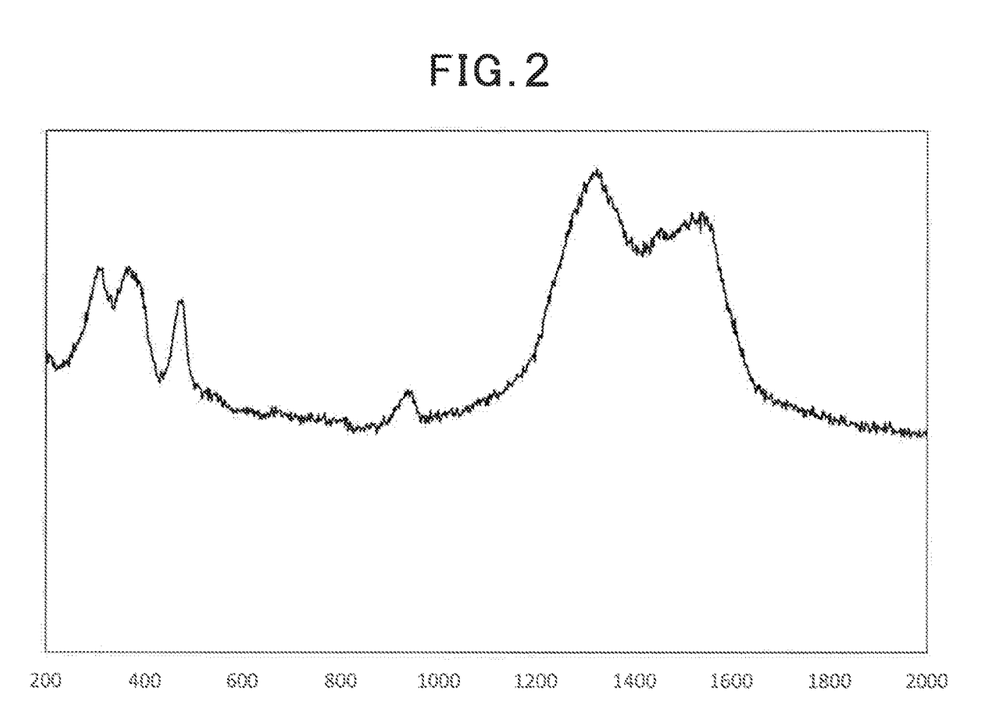
FIG. 2 is a graph showing results of Raman spectrum analysis of the sulfur-based active material obtained in Example 1.

The obtained sulfur-based active material was subjected to Raman spectral analysis under the conditions of excitation wavelength λ=532 nm, grating: 1200 gr/mm, and resolution: 1.2 $cm^{-1}$ using RAMANtouch manufactured by Nanophoton Corp. (FIG. 2). Besides, in FIG. 2, the vertical axis represents relative intensity, and the horizontal axis represents Raman shift ($cm^{-1}$). In the obtained sulfur-based active material, peaks were observed around 1530 $cm^{-1}$, around 1320 $cm^{-1}$, around 940 $cm^{-1}$, around 470 $cm^{-1}$, around 370 $cm^{-1}$, and around 310 $cm^{-1}$ within a range of 200 $cm^{-1}$ to 1800 $cm^{-1}$. The peak around 1320 $cm^{-1}$ was the main peak.

(Elemental Analysis)

Elemental analysis was performed on the obtained sulfur-based active material. For carbon, hydrogen, and nitrogen, a mass ratio (%) in a total amount of the sulfur-based active material was calculated from a mass measured using a fully automatic elemental analyzer, varix MICRO cube manufactured by Elementar. In addition, for sulfur, a mass ratio (%) in a total amount of the sulfur-based active material was calculated from a mass measured using a column (IonPac AS12A) manufactured by Dionex Corporation for an ion chromatograph device DX-320 manufactured by Dionex Corporation.

(Production of Lithium-Ion Secondary Battery)

[1] Positive Electrode

The above-described sulfur-based active material, acetylene black as a conductive auxiliary agent, and acrylic resin as a binder were used. The sulfur-based active material: the conductive auxiliary agent: the binder was weighed at a ratio of 90:5:5 (mass ratio), placed in a container, stirred and mixed with a rotating and revolving mixer (ARE-250 manufactured by Thinky Corporation) using milliQ water as a dispersant to produce a uniform slurry. The produced slurry was coated onto an aluminum foil having a thickness of 20 μm using an applicator having a slit width of 60 μm, and a positive electrode compressed with a roll press was dried by heating at 120° C. for 3 hours with a dryer, followed by punched to φ11 to obtain a positive electrode for a lithium-ion secondary battery. Then, a weight of the positive electrode was measured, and an amount of the active material in the electrode was calculated from the ratio mentioned above.

[2] Negative Electrode

As a negative electrode, a metallic lithium foil (a disk shape foil with a diameter of 14 mm and a thickness of 500 μm, manufactured by Honjo Metal Co., Ltd.) was used.

[3] Non-Aqueous Electrolyte

As a non-aqueous electrolyte, an electrolytic solution in which $LiPF_6$ was dissolved in a mixed solvent of ethylene carbonate and diethyl carbonate was used. Ethylene carbonate and diethyl carbonate were mixed at a volume ratio of 1:1. A concentration of $LiPF_6$ in the electrolytic solution was 1.0 mol/L.

[4] Battery

A coin battery was produced using the positive and negative electrodes obtained in [1] and [2]. Specifically, in a dry room, a separator (Celgard 2400 manufactured by Celgard, LLC, polypropylene microporous film having a thickness of 25 μm) and a glass non-woven fabric filter (thickness: 440 μm, manufactured by ADVANTEC, GA100) are interposed between the positive electrode and the negative electrode to form an electrode body battery. This electrode body battery was accommodated in a battery case composed of a stainless-steel container (CR2032 type coin battery member, manufactured by Hohsen Corp.). The electrolytic solution obtained in [3] was injected into the battery case. The battery case was sealed with a caulking machine to produce a coin-type lithium-ion secondary battery of Example 1.

Other Examples/Comparative Examples

The same treatment as that in Example 1 was performed according to the formulation shown in Table 1 to produce a lithium-ion secondary battery.

<Test Method>
(Charge/Discharge Capacity Measurement Test)

The coin-type lithium-ion secondary battery produced in each Example and Comparative example was charged and discharged with a current value corresponding to 50 mA per 1 g of a sulfur-based active material under the condition of a test temperature of 30° C. A discharge final voltage was set to be L0 V, and a charge final voltage was set to be 3.0 V. In addition, the charging/discharging was repeated 30 times, where a discharge capacity (mAh/g) in each time was measured, and the second discharge capacity (mAh/g) was regarded as an initial capacity. The results are shown in Table 1. In this regard, it can be evaluated that the larger the initial capacity is, the larger the charge/discharge capacity of the lithium-ion secondary battery is, which is preferable.

Furthermore, a capacity retention (%) was calculated from the 10th discharge capacity $DC_{10}$ (mAh/g) and the 30th discharge capacity $DC_{30}$ (mAh/g) by the following formula. The results are shown in Table 1. In this regard, it can be said that the larger the capacity retention is, the more excellent the cycle characteristics of the lithium-ion secondary battery is.

(Capacity retention (%))=($DC_{30}$ (h/g))/($DC_{10}$ (mAh/g))×100

TABLE 1

| | | Comparative example | Example | | |
|---|---|---|---|---|---|
| | | 1 | 1 | 2 | 3 |
| Sulfur-based active material | | | | | |
| Raw material (Parts by mass) | Particle 1 | 100 | — | — | — |
| | Particle 2 | — | 100 | — | — |
| | Particle 3 | — | — | 100 | — |
| | Particle 4 | — | — | — | 100 |
| | Sulfur | 500 | 500 | 500 | 500 |
| Expansion starting temperature of particle (° C.) | | 158 to 173 | 123 to 133 | 135 to 150 | 125 to 135 |
| Calcinating temperature (° C.) | | 450 | 450 | 450 | 450 |
| Elemental analysis (%) | C | 45.0 | 35.6 | 35.1 | 36.3 |
| | H | 1.6 | 0.8 | 0.7 | 0.8 |
| | N | 14.7 | 12.4 | 12.1 | 12.7 |
| | S | 34.6 | 47.5 | 44.9 | 44.3 |
| Evaluation on battery | | | | | |
| Discharge capacity (mAh/g) | 1st | 578 | 831 | 848 | 770 |
| | 2nd | 401 | 635 | 638 | 587 |
| | 10th | 350 | 609 | 601 | 557 |
| | 30th | 335 | 584 | 569 | 546 |
| Capacity retention (%) | | 95.7 | 95.9 | 94.7 | 98.0 |

From the results in Table 1, it can be found that the lithium-ion secondary battery using the sulfur-based active material of the present disclosure as an electrode material has excellent charge/discharge capacity and cycle characteristics.

INDUSTRIAL APPLICABILITY

By using the sulfur-based active material of the present disclosure as an electrode material, a non-aqueous electrolyte secondary battery having a large charge/discharge capacity and excellent cycle characteristics can be produced inexpensively and easily.

EXPLANATION OF NUMERALS

1. Reaction apparatus
2. Raw material
3. Reaction vessel
4. Lid made of silicone
5. Alumina protective tube
6. Gas introduction tube
7. Gas discharge tube
8. Electric furnace
9. Thermocouple
10. Temperature controller
11. Sodium hydroxide aqueous solution
12. Trap tank

What is claimed is:

1. A method of producing a non-aqueous electrolyte secondary battery that comprises positive and negative electrodes, wherein at least one of the electrodes is formed from a sulfur-based active material that is obtained by calcination at 250 to 550° C. of (1) heat-expandable particles and (2) sulfur,
   wherein the obtained sulfur-based active material has peaks of 1530 $cm^{-1}$±8 $cm^{-1}$, 1320 $cm^{-1}$±8 $cm^{-1}$, 940 $cm^{-1}$±8 $cm^{-1}$, 470 $cm^{-1}$±8 $cm^{-1}$, 370 $cm^{-1}$±8 $cm^{-1}$ and 310 $cm^{-1}$±8 $cm^{-1}$ within a range of 200 $cm^{-1}$ to 1800 $cm^{-1}$ in a Raman spectrum, and wherein the peak 1320 $cm^{-1}$±8 $cm^{-1}$ is the main peak,
   wherein the method comprises:
      calcinating at 250 to 550° C. components (1) and (2):
         (1) the heat-expandable particles which comprise an outer shell comprising an acryl-based copolymer and a hydrocarbon included inside the outer shell, wherein the heat-expandable particles have an expansion starting temperature of 150° C. or lower, and
         (2) the sulfur in an amount of 250 to 1500 parts by mass based on 100 parts by mass of the heat-expandable particles to form the sulfur-based active material; and
      incorporating the sulfur-based active material into the at least one electrode which is in turn incorporated into the non-aqueous electrolyte secondary battery.

2. The method of producing the non-aqueous electrolyte secondary battery according to claim 1, wherein the acryl-based copolymer is a copolymer comprising methacrylonitrile as a monomer component and one or more monomer components other than methacrylonitrile.

3. The method of producing the non-aqueous electrolyte secondary battery according to claim 2, wherein one or more monomer components other than methacrylonitrile are one or more selected from the group consisting of acrylonitrile and a (meth)acrylic acid ester.

4. The method of producing the non-aqueous electrolyte secondary battery according to claim 1, wherein the hydrocarbon is one or more selected from the group consisting of isobutane, isopentane and isooctane.

5. The method of producing the non-aqueous electrolyte secondary battery according to claim 1, wherein the sulfur-based active material is obtained by calcination at 250 to 550° C. of the components (1) and (2), as well as (3) a conductive auxiliary agent.

6. The method of producing the non-aqueous electrolyte secondary battery according to claim 5, wherein the conductive auxiliary agent is a conductive carbon material.

7. The method of producing the non-aqueous electrolyte secondary battery according to claim 1, wherein a particle size of the heat-expandable particle is 0.1 to 1000 μm.

8. The method of producing the non-aqueous electrolyte secondary battery according to claim 1, wherein the heat-expandable particle has a hydrocarbon content of 1 to 70% by mass.

9. The method of producing the non-aqueous electrolyte secondary battery according to claim 1, wherein the sulfur-based active material comprises sulfur of 40% by mass or more.

10. The method of producing the non-aqueous electrolyte secondary battery according to claim 1, wherein the obtained sulfur-based active material includes sulfur incorporated into the acryl-based copolymer to form a three-dimensionally cross-linked structure.

* * * * *